United States Patent
Hoffstadt

(10) Patent No.: US 11,962,738 B2
(45) Date of Patent: Apr. 16, 2024

(54) METHOD FOR PERFORMING TRANSFORMATIONS OF COLOR DATA

(71) Applicant: GMG GmbH & Co. KG, Tübingen (DE)

(72) Inventor: Johannes Hoffstadt, Ulm (DE)

(73) Assignee: GMG GMBH & CO. KG, Tübingen (DE)

(*) Notice: Subject to any disclaimer, the term of this patent is extended or adjusted under 35 U.S.C. 154(b) by 0 days.

(21) Appl. No.: 18/234,080

(22) Filed: Aug. 15, 2023

(65) Prior Publication Data
US 2024/0056542 A1 Feb. 15, 2024

(30) Foreign Application Priority Data
Aug. 15, 2022 (EP) .................... 22020391

(51) Int. Cl.
*H04N 1/60* (2006.01)
*H04N 1/54* (2006.01)

(52) U.S. Cl.
CPC ............ *H04N 1/54* (2013.01); *H04N 1/6025* (2013.01)

(58) Field of Classification Search
CPC .............................. H04N 1/54; H04N 1/6025
See application file for complete search history.

(56) References Cited

U.S. PATENT DOCUMENTS

| | | | | |
|---|---|---|---|---|
| 5,564,006 A | * | 10/1996 | Reed ......... | H04N 1/54 358/518 |
| 5,734,800 A | * | 3/1998 | Herbert ...... | H04N 1/54 358/1.9 |
| 7,852,514 B1 | * | 12/2010 | Chinn ........ | G01J 3/02 358/1.9 |
| 2002/0067493 A1 | * | 6/2002 | Odagiri ...... | H04N 1/6033 358/1.9 |
| 2002/0167527 A1 | * | 11/2002 | Senn ......... | G01J 3/462 345/592 |
| 2004/0100640 A1 | * | 5/2004 | Saito ........ | H04N 1/6025 358/1.1 |
| 2009/0310154 A1 | * | 12/2009 | Morovic ...... | H04N 1/54 358/1.9 |
| 2011/0007332 A1 | * | 1/2011 | Maltz ........ | H04N 1/6019 358/1.9 |
| 2012/0099157 A1 | * | 4/2012 | Wurster ...... | G01J 3/52 358/3.01 |
| 2017/0118382 A1 | * | 4/2017 | Sugita ....... | H04N 1/6055 |
| 2022/0070335 A1 | * | 3/2022 | Matsushima ... | H04N 1/603 |

FOREIGN PATENT DOCUMENTS

DE 102004003300 A1 * 8/2005 .............. H04N 1/54

\* cited by examiner

*Primary Examiner* — Ted W Barnes
(74) *Attorney, Agent, or Firm* — MILLEN, WHITE, ZELANO & BRANIGAN, P.C.; Ryan R. Pool

(57) ABSTRACT

The invention includes a method for the computer-aided performance of color space transformations with high accuracy that provides a result which is as close as possible to the original. The source color space includes n colors, the target color space includes m values, and combinations of the m components of the target color space are assigned to at least some combinations of the n colors of the source color space via the transformation rule TRV.

9 Claims, 3 Drawing Sheets

METHOD FOR PERFORMING TRANSFORMATIONS OF COLOR DATA

The present invention relates to a method for performing transformations of color data from a source color space with n colors to a target color space with m values using a transformation rule TRV.

In the printing industry, color transformations are very often required to produce the data sets for the color printed products to be printed.

The starting point is digital layouts, which may contain, for example, color images from photography or scanning, illustrations and text. These layouts are templates that are to be reproduced accordingly in the form of printed products. Such a layout has been designed or developed in whatever form and represents in terms of color appearance what is desired for the intended purpose. A layout usually comprises several layout objects. Each individual layout object therefore has a color appearance that can be uniquely identified. As is well known, color appearances are created by mixing only a few colors, for printed products, for example, by simply printing screened printing inks on top of each other, with each color making a certain contribution through its effect and the final result being created in the interaction of the different color layers.

The color appearance of each layout object is defined by its color values (of image pixels, outline colors, or fill colors), which represent the data source. In the case of image pixels, there are often millions of pixels, each with its own color values. These source color values always refer to a source color space with a specific number of colors. This means that each object in the layout is assigned a color space, which usually has a relationship to a device, often a very specific RGB color space such as sRGB or Adobe RGB, or a CMYK color space, only black (grayscale) or another printing color space. The object color values are quantified accordingly as RGB values, CMYK or grayscale values (0-100% color), or other color values. The total number of device colors of the source color space is denoted here by n.

Color spaces are usually described by ICC color profiles (ISO 15076-1:2010), layouts by PDF and PDF/X files (ISO 15930 series) that contain or can reference these ICC color profiles. For the most different reasons and motives the layout is to be reproduced. A wide variety of printing processes and presses are available for reproduction. These have the possibility to apply a certain number of colors in a certain way on a carrier material. These are the device colors of the printing system. These define or are the basis of the target color space, which in turn comprises all conceivable combinations of the device colors of the printing system. This is referred to as the m device colors of the target color space. Transformations into device-independent values are also often necessary, such as Lab or spectral colors (see below), for example to be able to check the results of later measurements of printouts or to provide a device-independent database for display on any device. This is why the generic term used is the m values of the target color space.

Standardized color spaces are often used as source color spaces when designing the layout, but printing takes place using concrete output systems with their own individual color behavior. Therefore, for each halftone dot of the layout, it is necessary to transform the given combination of the n device colors of the source color space into a combination of the m device colors of the target color space required for printing. The aim here is to produce a result through printing that comes as close as possible to the original, i.e. the digital layout, i.e. ideally produces the same appearance for the viewer.

A halftone point or pixel is any point on a layout that results from a specified rasterization of the layout objects. This in turn is related to the so-called resolution of the representation, for example, for the creation of the print form. If a grid with i rows and j columns is laid over a layout, this results in a resolution of i×j pixels. Each individual pixel can now be identified with regard to its color construction.

Color transformations are used to convert the layout data into printable data for a desired set of printing colors. This results, for example, in uniform, pure CMYK data for offset printing. Color transformations are also used to simulate the color appearance of these print data in a binding manner before printing. The color appearance is usually described device-independently in the CIELAB color space (Lab for short) or with the aid of spectral reflection factors. The print data with its assigned color space is transformed into these device-independent color data. These are displayed on a calibrated screen or with special proof printing systems (a so-called "proof", usually with inkjet systems). Related to this is the task of adapting print data for other printing processes, i.e. generating new print data for other inks from existing print data by means of a transformation, while retaining the original color impression as well as possible.

For the usual printing processes with usually no more than four colors, these transformation processes are largely tapped and standardized by corresponding data systems.

However, in packaging printing, for example, more than 4 printing colors are very often used. Traditionally, brand colors are added as spot colors and images are built up with product-specific colors (e.g. dairy products with an additional light gray printing color, chocolate products with various brown printing colors). For transparent film packaging, white printing ink is often used in addition. Each ink used occupies a printing unit in the press and requires its own printing forme for ink transfer. The colors are applied one after the other, and in principle all colors can be combined with each other (overprintable). The totality of the separate printing forms leads to the term "separation" as a process or result of the creation of the print data.

Machines with 7-10 inking units are not uncommon in flexo, offset and gravure printing. Designers for branded products can select the printing inks from thousands of spot colors, for example, from over 2000 shades in the PANTONE® system. These inks are produced and supplied by ink manufacturers. In so-called digital printing, inkjet and toner-based presses are used, which often contain 6-8 inking units, but are operated with fixed ink sets, since inkjet inks and colored toners often have to have very special, machine-dependent processing properties, or changing them would be too technically complicated. Typical color sets contain CMYK supplemented by orange or red, green, blue or violet, white.

Digital printing processes currently work more slowly than conventional printing processes, but since no printing forms have to be created and colors are not changed, the setup effort is much lower, making short runs more economical and personalized printing possible. Here, therefore, there is a desire to print an initially conventionally produced package in short runs or even personalized (run 1) as required, but the color appearance should be as identical as possible to previously printed products produced with individual spot colors. This is because different batches can stand side by side on the sales shelf. To achieve this, the print data available for the conventional printing process is converted from its source color space into a target color space that describes the digital printing process. In the extreme case of variable, personalized printing, different source data must be transformed for each copy, in which case the transformation becomes a bottleneck.

The color transformations mentioned at the beginning thus convert from a source color space Q (for example with n device colors) into another target color space Z with m values (for example device colors or the 3 CIELAB values L, a, b). This is done by applying a transformation rule TRV. These can be calculation formulas, transformation models or transformation tables already created based on TRV. They must be applied often per pixel, so high throughput is important (millions of pixels per second). To achieve this, interpolation is done in a prepared table, such as in the ICC industry standard. The table is built for combinations of n color values. Each of the n input colors can take values between 0 and 100% ink coverage. The table cannot list all combinations, but samples each input color at a certain specified resolution. It is a regular rectangular n-dimensional grid containing all combinations of the sampled levels. In between, n-dimensional interpolation is applied. The accuracy depends on the sampling. Typical samples are for n=3 (RGB/Lab) 33 steps ($33^3 \approx 36000$ table entries), for n=4 (CMYK) 17 steps (every 6.25%, $17^4 \approx 84000$ table entries). The number of gradations is the base of the power, the number n of inks is in the exponent. The generation of transformation tables are measures that are familiar to those skilled in the art. They are based, for example, on the spectrometric measurement of printed inks, calculations for estimation and/or interpolation, and the like.

The table size increases exponentially with the number n of input colors. Because the memory space is limited, the sampling must become coarser for practical reasons. For the frequent case n=7, often only 6 or 7 levels are used. An example is the widely used open source color management system LittleCMS, which uses 7 stages (every 16.67%, $7^7 \approx 820000$ table entries). The table structure therefore leads to the following problem: the more inks, the larger the table, and the fewer gradations can be stored. Users expect a comparable accuracy with CMYK+additional colors as they are used to with CMYK. 7 steps are considerably too coarse.

Known solution approaches are disclosed in DE 10 2004 003 300 A1, according to which assignment tables that have more than four input color components are divided into several assignment tables with a maximum of four input color components. This technique is intended to solve the problem of allocation tables that are too large. It is a concrete proposal to solve this problem by basically reducing to 4-component tables, according to convention, since the prior art takes advantage of the fact, valid at its time, that even in seven-color printing, usually no more than four colors are printed on top of each other at one point on the printed sheet. For this reason, the reduction to 4-component tables is also being pushed. To ensure this in case of doubt, additional processes such as Gray Component Replacement (GCR) and Color Component Replacement (CCR) are applied when creating the separation table. A similar prior art results from Boll H: "A COLOR TO COLORANT TRANSFORMATION FOR A SEVEN INK PROCESS", PROCEEDINGS OF SPIE, IEEE, US, Vol. 2170, Feb. 1, 1994 (1994-02-01), pages 108-118, and U.S. Pat. No. 5,892,891 A.

Known solution approaches use a model or a combination of table and model. A model is usually a mathematically based transformation rule. In this way, the Lab color value of an overprint can be estimated from the individual printing colors. This is done, for example, when displaying layouts or PDF files on the screen and is fast but inaccurate. In the ICC further development iccMAX it is suggested to spectrally offset single colors, or to use tables for the CMYK portion and to modify their value for each additional color. In all cases, adding individual colors is too inaccurate because it does not or insufficiently take into account the interaction of colors in overprints in which these colors are involved.

There are more accurate models that better calculate the overprinting behavior of color mixtures, but they are nowhere near fast enough to be useful for transforming millions of pixels. In addition, the models provide Lab values or spectra, but no device color values, so they are not suitable for direct device-to-device ("device-link") transformation. This is because the device color values to be output are often subject to special separation rules (see below) and usually require special processing for high quality. However, the transformation into device colors is an extremely common application.

As already detailed, the color characterization of overprinted inks is mapped using tables that perform the transformation of print color components on the input side into m device-independent values (e.g. CIELAB color values or reflectance spectra) or into m device color values of another output device. These output-side values are tuples, e.g., 3 Lab components, m ink components, or m spectral value components (for m wavelength bands). Calculations on these tuples are performed on a component-by-component basis.

These tables are usually based on color combinations on test charts, i.e. they exist only for those color combinations that were printed in a print test and then colorimetrically measured. Such tables are also frequently stored in the form of ICC profiles and used for transformations.

Very often CMYK test charts are used to accurately sample the color gamut of these 4 important colors. If CMYK is supplemented by further process colors to increase the color gamut, orange or red (here O), green (G), blue or violet (here V) are often used. These colors are each intended to expand a chromaticity sector (ECG, Expanded Color Gamut). A well-known process (Equinox™) uses CMYK test charts and replaces each color with its complementary color during printing. This results, for example, in test charts for OMYK (C replaced by O), CGYK (M replaced by G), CMVK (Y replaced by V), and thus also the transformation tables for the CMYK, OMYK, CGYK, CMVK color groups. In addition, it is common practice in packaging printing to exchange the black printing color of CMYK for another dark color such as dark blue, dark green or dark brown, if one has such as important and frequent brand colors and wants to use them in collation printing, because then one can use the well-established 4-dimensional CMYK-like color processing.

However, for other additional colors (X, . . . ) that are not used regularly in the process, but only for individual jobs, there are too many combinations for it to be worthwhile to print test charts (such as CMY+X for many different X). Such colors are usually only characterized individually, e.g. reference data is licensed for Pantone® colors.

Even though print data normally use at most 4 colors at the same time, and as a consequence color characterizations are often limited to at most 4 colors at the same time, and layout objects then need only at most 4-color source color spaces, it happens that elements with more than 4 colors have to be transformed. Two typical causes are trapping and image scaling with resampling, see FIG. 2.

Traps are contour enlargements of vector objects that abut each other in the layout to avoid so-called "flashes" caused by register in conventional printing processes. These enlargements cause the objects to overlap somewhat. The overlap can then contain more printing colors than the individual objects (e.g. the union quantity). Especially in proofing applications, one wants to see these process-important new edges as well. It would not be acceptable to get a signal color here instead, indicating that no information is available for this overlap.

When processing pixel data (from images or from rasterized vector data), there is often an adjustment of the resolution. Then neighboring pixels are proportionally mixed by rescaling (bilinear or bicubic scaling, antialiasing). The mixture then also contains the union quantity of the inks of the contributing pixels.

So input data to be transformed can occur with 5 colors even if there are no more than 4-color objects in the layout, both for vector and pixel data. But if there are no transformation rules that let transform the 5 colors from the source color space into the m values of the target color space, conventional transformations using transformation tables, for example, are not possible.

This can be said in general for transformations of color data from the n colors of a source color space into the m values of a target color space, if combinations of the color data from the n colors of the source color space include both portions or subgroups for which transformation tables are available and those for which no transformation tables are available.

US 2011/0007332 discloses a method to enable transformations of n>4 colors, which requires coarse resolution n-color transformation data to be available in addition to the exact 4-color transformations. The method uses multiple interpolations to first obtain a coarse result from the coarse n-dimensional table and improve it by combining it with interpolations in the accurate 4-color tables and further interpolations of the intermediate results. Without the n-color transformation table, the method cannot be applied. However, their generation is very costly, for example if they are based, as suggested there, on some measurements on prints with many colors, whose production requires suitable printing forms and setup times for each color combination, and which is very uneconomical with the large number of common spot colors, as described above. It is desirable to get along also without the knowledge of n-color tables.

Based on the prior art described above, the invention is based on the task of improving a method for performing color space transformations using transformation rules in such a way that even combinations of color data from the n colors of the source color space, which include both components or subgroups for which transformation tables are available and those for which no transformation tables are available, can be transformed with high accuracy into the m values of the target color space in such a way that a result that comes as close as possible to the original can be achieved.

The technical solution to this task consists in a method with the features of patent claim 1. Further advantages and features result from the subclaims.

The invention provides a fast estimation method that assembles mixtures from known subcomponents. For example, if the input asks for a mixture CMYKO, but only interpolation tables or ICC color profiles for CMYK as well as for OMYK are available, the entries are cleverly combined.

According to the invention, a method is proposed for performing transformations of color data from a source color space with n colors into a target color space with m values using a transformation rule TRV, where a color i is one of the n colors of the source color space and the color components of the colors $q(1), q(2), \ldots, q(n)$ are assigned values $z(1), z(2), \ldots, z(m)$ of the target color space at least for some combinations of the n colors of the source color space, characterized by the following steps:

a) for a combination KB of the n colors of the source color space with color components $q^{KB}(1)$ to $q^{KB}(n)$ for which no combination of the m components $z^{KB}(1)$ to $z^{KB}(m)$ of the target color space is assigned via the TRV, select a color i of the combination KB which has a color component $FA=q^{KB}(i)>0$ and for which the following conditions apply:

i) the remaining combination of color components $q^{KB}$ (j not equal to i) without the component of color i is assigned a combination of the target color space with components $z(1)^i, z(2)^i, \ldots, z(m)^i$, and ii) two further, with one exception mutually identical combinations of color components $q(1)$ to $q(n)$ exist, to each of which a combination of components $z(1)$ to $z(m)$ is assigned and wherein the two combinations of color components $q(1)^1$ to $q(n)^1$ and $q(1)^2$ to $q(n)^2$ differ only in that the color component $q(i)$ of color i in the one $q(i)^1=FA>0$ and in the other $q(i)^2=0$, so that 1) the combination $q(1)^1$ to $q(n)^1$ with color component $q(i)^1=FA$ is assigned a corresponding combination of the components $z(1)^1, z(2)^1, \ldots, z(m)^1$ of the m values of the target color space, which forms the color data set Z1, and 2) the combination $q(1)^2$ to $q(n)^2$ with color component $q(i)^2=0$ is assigned a corresponding combination of the components $z(1)^2, z(2)^2, \ldots, z(m)^2$ of the m values of the target color space, which forms the color data set Z2, iii) Calculating the ratios $V(1)^i, V(2)^i, \ldots, V(m)^i$ of each component $z(1)^1, z(2)^1, \ldots, z(m)^1$ of the m values of the color data set Z1 to the respective component $z(1)^2, z(2)^2, \ldots, z(m)^2$ of the m values of the color data set Z2, which form a set of factors $V(1)^i=z(1)^1/z(1)^2$ $V(2)^i=z(2)^1/z(2)^{12}, \ldots, V(m)^i=z(m)^1/z(m)^{12}$, b) Applying the factors $V(1)^i, V(2)^i, \ldots, V(m)^i$ for transformations of combinations KB of colors of the source color space with n colors, which contain the color component FA of color i, but for which the color component $q(i)=0$ is set for the transformation, into the target color space with m components by multiplying the $z(1)^i, z(2)^i, \ldots, z(m)$ of the target color space resulting from the transformation by the respective factors $V(1), V(2), \ldots, V(m), z(m)^i$ of the target color space are multiplied by the respective factors $V(1)^i, V(2)^i, \ldots, V(m)^i$.

The underlying idea is to construct the output values for an unknown input combination step by step from the output values of known input combinations, estimating at each step the color impact (on the output values) of added input colors and adding this contribution in a way that is detailed below.

In a known input color combination, i.e. for which output color values are available, e.g. by table or interpolation, the sought contribution of partial colors within this color combination is determined as follows. The input combination "AB" is decomposed into the contribution of the partial colors "A" and the contribution of the remaining colors "B", with the aim of describing the color effect of "A" relative to the base "B", so that it can then be applied to another base "C" to estimate an unknown combination "AC".

In the approach proposed here, the blend AB is considered as an overlay of two layers A and B and the established "blending modes" of computer graphics are used (W3C, PDF, Photoshop). The most important blending mode is "Multiply". It is based on linear color values, in this case "linear values", normalized between 0 and 1. "Multiply" multiplies the linear values of two layers in a light-related color space (in computer graphics this is often RGB) to simulate the darkening, inking overlay of the colors. The effect is similar to an overprint.

Then applies: Linear values of the mixture AB=(linear values of A)*(linear values of B). After the searched colored contribution of A, thus the factor "linear values of A", can be solved. The linear values of AB and B are both known from the table containing AB. In an optical analogy, the linear values of A behave like a transmission factor of the added colors, applied to the linear values of the base B.

For linear light-related target color spaces such as CIEXYZ and reflectance spectra, their output values can be taken directly as linear values; for CIELAB, they are first converted to CIEXYZ, calculated in CIEXYZ, and converted back at the end of the calculations.

For nonlinear RGB target color spaces, calculations are performed in their linearized domains, e.g. in the case of gamma-based RGB color spaces with values from 0 to 1, the nonlinearity is removed by exponentiation with gamma, the RGB linear values linearized in this way are used, and finally one returns to the nonlinear RGB space by exponentiation with 1/gamma.

In an ink-related target color space, the print color values x between 0-100% are inverted to their complementary values (1−x) and linearized analogously to the RGB case and de-linearized again after the offset. These complementary values are the linear values for Multiply. The calculation with print color values thus corresponds formulaically to the Blending Mode "Screen", also called "inverse multiply". This follows the usual processing in PDF for RGB or DeviceCMYK (Adobe, PDF Blend Modes, Addendum to PDF Reference 5th edition, version 1.6, 2006, p. 2, p. 6). The complementary values again behave like transmission factors, and the ink contributions themselves therefore like absorptions.

This approach is similar to the well-known concept of the ink acceptance formula in printing according to Preucil, in which the linear color values, here the reflectance values, of the ink B printed first and the ink A printed on top are measured individually as well as in the combined print AB, and the latter measurement is approximated with the product approach $AB \approx A^{fa} * B$, here to determine the unknown ink acceptance factor "fa", which modifies A by a mostly reduced film thickness <1. In contrast, the invention uses the known linear values of AB and B to determine the color effect of A from the AB=A*B approach.

Herein is proposed a method to determine the color effect of some colors A within a known combination AB and apply it to other colors C to estimate the output values for a combinations AC.

In the simplest form, one can describe separately for each input color its effect on the substrate by comparing the output values of the input color value with the output values of the substrate (input color value zero). The difference in the output values is a measure of the color effect of the input color in its quantity described by the value. All these effects are then added together.

However, the further proposal according to the invention significantly improves the estimation of a color combination by adding individual inks to the substrate step by step by proceeding in printing sequence, i.e., as the individual inks are applied to the substrate one after the other, and taking into account process-typical ink acceptance properties, which are known to be about 75% for wet-on-wet overprinting of solids in offset printing, for example, by correcting the transmission factors, i.e., the linear values, exponentially with the ink acceptance.

If, on the other hand, not only single colors but also color combinations in subspace tables are known, it is better, according to a suggestion in accordance with the invention, to read off the interaction of a group of as many partial colors of the input combination as possible directly from existing tables as known output values instead of estimating it from single colors. At the beginning, one selects a group of colors for which a subspace table is available, for example in such a way that its input color values already cover as large a proportion as possible of the entire input combination. Then, from the remaining input colors, one identifies, for example, the one whose input color value has the largest share in the combination, and selects a subspace table that contains this color (ideally with a large overlap to the already known colors). For this subspace, one determines the color effect of this color by reading the output color values with this color as well as without this color and comparing them again. The difference is again a measure of what happens when this color is added to the given color value. So you apply this difference to the output values of the initial color group and thus you have added a color. This is the new initial combination for the next step, in which the next remaining color is identified and added until all the colors in the input combination are included.

The method according to the invention is proposed generalized as follows:

For a given input, color groups are searched for, for which a transformation is available, for example as a table, and which contain a part of the input combination. (The complete combination is not included, for it is to be estimated). This set of color groups is processed step by step. For example, one color group is selected as a starting point, and in the first step a second one is selected to be used to add an input color. In further steps more color groups are selected until all colors occurring in the input have been added.

The following happens per step: First, the common printing colors (intersection) are identified from the color groups involved in the step—this is at least two, at most the entire set. If there are no common inks, the intersection is the unprinted substrate, i.e. the zero entry in the table.

Each color group of the step thus contains on the one hand the common printing inks, but also additional ones. For each color group, these additional, i.e. the non-common printing inks are identified.

For each color group, the contained part of the input is considered as a mixture. The mixture is decomposed into the contribution of the common colors, which represents the "base" in the above calculation, and the contribution of the additional ("added") colors. This gives a measure of their color effect (relative to the base).

In this way, the color contribution of a color component A in a mixture AB relative to a base B is determined for each group in the target color space of the output colors. The crucial point is that this contribution can subsequently be applied to other bases, i.e. composed. Thus, for each color group involved, the contributions of the common colors as bases and the additional colors as complements are fixed. Now the contributions of the complements can be applied to the other color groups in this step. Thus one or more estimates are obtained for a previously unknown color mixture.

If several decompositions have happened in a step and therefore alternative combinatorial ways of composition are possible, these are weighted and averaged to a final result of the step, where a useful weight is the relative certainty of the estimate (such as the distance from the partial results considered known). Below, an example explains that this increases the quality of color transition transformation results because jumps are avoided.

A step is completed with the averaging. The final result of the step, as a newly generated color group now known through the estimation, is offset in the next step with further color groups, which in turn bring in further input colors, until finally the combination of all input colors is estimated. In this way, mixtures are composed step by step until the input is complete.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 22020391.3, filed Aug. 15, 2022, are incorporated by reference herein.

In the following example with the color groups CMYK and OMYK different strategies are shown, which represent different compromises between efficiency and accuracy. Further strategies are conceivable just because of the combinatorics of the decompositions, this execution is not limiting.

The desired input is a color combination of CMYK+O with proportions of 30% C, 60% M, 10% Y, 20% K, 50% O. There are tables for CMYK and for MYKO, but no table for CMYKO. For simplification, it is assumed that the tables already contain light-related linear output values.

The fastest way would be to use the first four colors, the CMYK color group, directly and only mix in the contribution of the missing colors (here only orange).

So first the output values of the CMYK color group 30% C, 60% M, 10% Y, 20% K are read.

The still missing color contribution of 50% O is determined in this way:

The common colors of CMYK and MYKO are MYK. The additional color of CMYK is C, that of MYKO is O. MYK is taken as the base B with the values 60% M, 10% Y, 20% K, the output values are read off, and so are the output values of the mixture AB with the values 60% M, 10% Y, 20% K, 50% O. The output values of the mixture AB are read off. The transmission factor by which the addition of the color quantity A of 50% O changes the base is the quotient of the output values of AB and B.

This factor is applied (multiplied) to the above reading of the output values of the CMYK color group 50% C, 60% M, 10% Y, 20% K and gives the desired result of the total CMYKO color values.

The advantage of this method is that you can go sequentially from left to right without making any decisions, read off the first tabulated color value and apply all the colors still to be added further to the right as relative factors from their own tables (A=AB/B).

An alternative is to use only the unprinted substrate instead of the common colors (here MYK) for B, then AB=A=the table value of 50% O, and the effect of 50% O is the quotient of the table value of 50% O and the table value of the unprinted paper.

But you can imagine that an orange has a different effect on white paper than in the presence of many other colors. We are looking for the effect in the presence of 30+60+10+20% CMYK color quantity. This is unknown, there is no table for it. In order to estimate it realistically, it is obvious to use not the possibly strong effect of 50% O on paper, but the presumably different effect of 50% O on a 60+10+20% MYK color set.

To increase accuracy, the size of the contributions to be added is considered. It is probably less accurate to add a large amount of paint 50% O than a smaller amount of paint 30% C. In other words, if one were to start with MYKO 60+10+20+50, one would already get 140% ink coverage as certain knowledge from the table, compared to only 120% ink coverage from CMYK 30+60+10+20 above. This improvement is bought with an additional sorting step.

However, this size-dependent procedure then still contains a preferred order, which then becomes a problem when two values converge in a gradient. Let's assume that cyan would increase pixel by pixel from 30% to over 50%. The size-based sorting would choose MYKO as the base for the first pixels and add the smaller C value. Once C is equal to or minimally larger, the base would change to CMYK because now the O contribution is the smaller one. Generally, a jump occurs because the result from base CMYK+ contribution 50% O is not equal to the result from base MYKO+contribution 50% C. This jump is an undesirable artifact.

A further increase in quality would therefore use both combinations of base+contribution as described and average them weighted. Then the transition is guaranteed to be steady.

A further example substantiates the process flow of the method according to the invention. The input color data are from a source color space with 4 color components $q(1)$, $q(2)$, $q(3)$, $q(4)$. These are to be transformed into a target color space with 3 color values $z(1)$, $z(2)$, $z(3)$.

The following transformation mappings are available for combinations of color components of the source color space: $T(1)$ $[q(1), q(2), q(3)]$, $T(2)$ $[q(1), q(2), q(4)]$, $T(3)$ $[q(1), q(3), q(4)]$, $T(4)$ $[q(2), q(3), q(4)]$, $T(5)$ $[q(3), q(4)]$.

The input data set included the following values for $q(1)$, $q(2)$, $q(3)$, $q(4)$:

20 40 60 80

First, a color i is to be selected. The necessary assignment conditions are fulfilled for all colors 1-4. Color 1 is chosen because its color component $q(1)$ is the smallest and therefore a presumably smaller influence has to be estimated and will be applied to a large, known target color combination of the color components of colors 2-4.

First, the combination of values $Z^i$ (without color portion of color i=1)

| 0 | 40 | 60 | 80 | for which there is T(4). This concerns the pairings of the largest values. This leads to the values $z(1)^i$, $z(2)^i$, $z(3)^i$ |
|---|----|----|----|---|
| 0 | 40 | 60 | 80 | 22,763    19,558    6,670 |

This is the basis. The influence of the color component FA=$q(1)$=20 is now determined.

To determine the influence of q(1), the combination of values with q(1)=FA

| 20060 | 80 | is chosen, for which T(3) exists. This leads to the values $z(1)^1$, $z(2)^1$, $z(3)^1$ (color data set Z1) | | |
|---|---|---|---|---|
| 20060 | 80 | 22,759 | 29,779 | 5,153 |

Then the combination of values is chosen where q(1)=0, the others equal, so

| 0060 | 80 | for which there is the T(5). This leads to the values $z(1)^2$, $z(2)^2$, $z(3)^2$ (color data set Z2) | | |
|---|---|---|---|---|
| 0060 | 80 | 42,435 | 31,883 | 6,821 |

The ratios $V^i$ of the two series of values to each other are formed:

| 0,701 | 0,714 | 0,755 |
|---|---|---|

These factors $V^i$ are now applied during the transformation. Thus from the base

| 04060 | 80 | 22,763 | 19,558 | 6,670 |
|---|---|---|---|---| by multiplying the result of the searched z(1), z(2), z(3) with the factors

| 204060 | 80 | 15,948 | 13,961 | 5,039. |
|---|---|---|---|---|

The invention describes a solution that is practicable and feasible for the person skilled in the art, with which a sufficiently fast and high-quality color space transformation into the color space of the concrete printing system is possible even with a very high resolution of a layout and a large number of input colors.

BRIEF DESCRIPTION OF THE DRAWINGS

Further advantages and features result from the following description based on the figures. Thereby show:

| FIG. 1 | a flow chart explaining the process steps. |
|---|---|
| FIG. 2 | A flowchart for estimating multiple missing colors. |
| FIG. 3 | the occurrence of more than 4-dimensional color data. |

Figure 1:
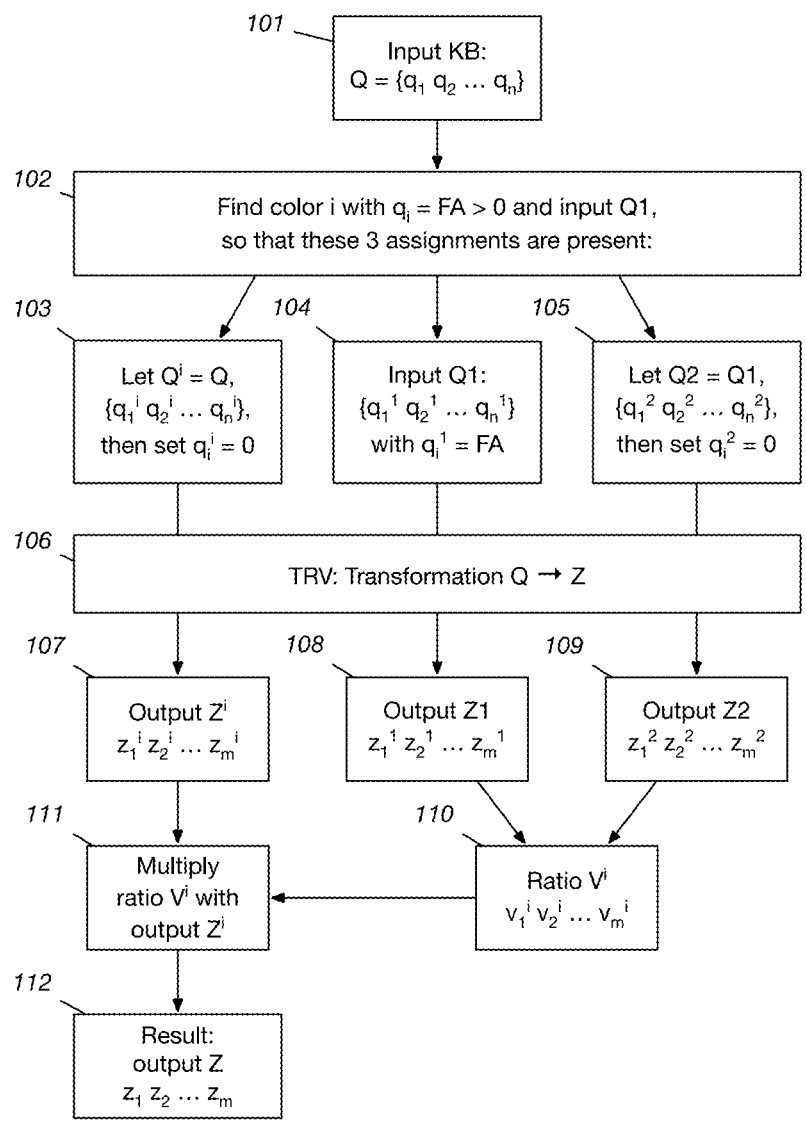

According to FIG. 1, there is an input combination KB of color data 101 with color components Q={q(1), q(2), . . . , q(n)} from the source color space with n colors, which is to be transformed into the target color space with combinations of m values. The non-vanishing color components of this combination form a so-called color group. In step 102, a color i is searched for from this color group, whose color component is thus FA=q(i)>0, and for which certain conditions apply:
  1) for the subset $Q^i$ (103) of the color data 101, for which the color component $q(i)^i$=0 is set, an output $Z^i$ (107) from the target color space must be assigned by the transformation rule TRV 106, which thus describes the transformation result of a color group without the color i, which is to be supplemented by the influence of the color i later.
  2) There must exist another input Q1 (104) for which $q(i)^1$=FA, and which is otherwise arbitrary, to which an output Z1 (108) is assigned by the transformation rule TRV 106, i.e. which describes the transformation result of this other input with the same color component FA of the color i.
  3) Appropriately, an input Q2 (105) is formed that is identical to Q1 except for the portion of color i that is $q(i)^2$=0. An output Z2 (109) is assigned to this input by the transformation rule TRV 106, thus describing the transformation result of this other input without the influence of color i.

If this color i exists, the influence of its color component FA is now estimated from the ratio $V^i$ (110) of the output pair Z1 and Z2 with and without color component FA. This influence can be applied to all combinations with color share q(i)=FA for which there is an assignment without FA, in particular, of course, to the input combination KB. For this purpose, in step 111 the output $Z^i$ without the contribution of color i is multiplied component-wise by the ratio $V^i$ (110). Thus the sought result 112 is formed, which is the estimate of the target color values for the entire color group input combination KB.

In other words, the color group of the input combination is reduced in size by removing color i, under the condition that an output is assigned to this smaller color group, and then color i is added by estimation so that the original color group is complete again. According to the invention, this reduction can also be carried out several times, so that after n steps at the latest one arrives at the empty color group, the unprinted substrate, for which an assignment can be easily determined. From there, if necessary, each individual color can be added step by step until the complete color group is obtained, as shown in FIG. 2.

Figure 2:
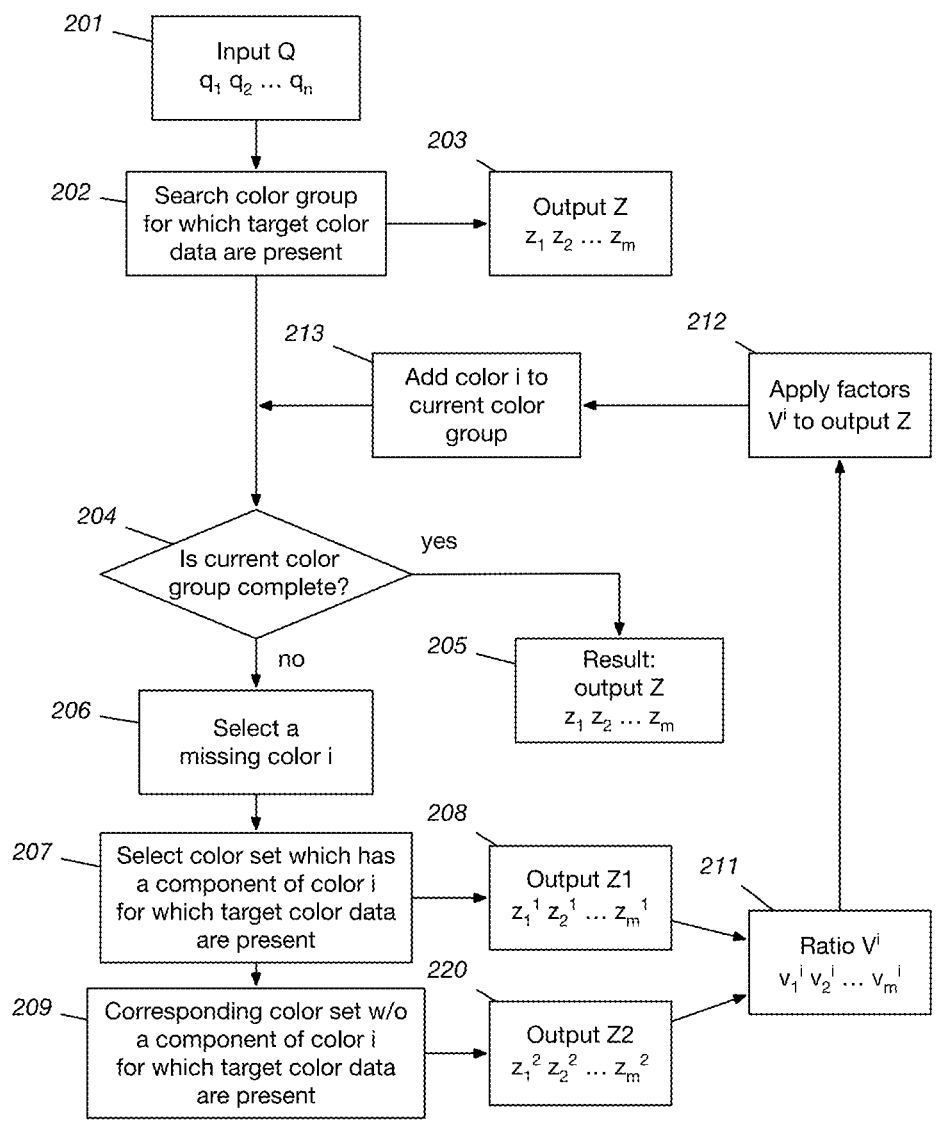

According to FIG. 2, there is color data 201 from the source color space with n colors, which are to be transformed and represent the input. In step 202, a color group is searched for which target color data 203 are available in the transformation rule. This color group is a subset of the color data 201 and is to be added to the full set step by step, while also adding the target color data 203 to the full output. If in step 204 the current color group is already complete, the output 205 is ready. Otherwise, one of the still missing colors i is selected in step 206. For this one, a pair of two color data sets Q1 and Q2 is now selected, namely in step 207 a color data set Q1, which contains the given color portion FA=q(i) of color i, and for which a combination of the m values $z(1)^1$, $z(2)^1$, . . . , $z(m)^1$ of the target color space, which form the color data set Z1 (208), and in step 209 the color data set Q2, which contains the same color components as Q1 for all colors except color i, while the component of color i is equal to 0, and for which a combination of the m values $z(1)^2$, $z(2)^2$, . . . , $z(m)^2$ of the target color space is present, which form the color data set Z2 (210). Both selected data sets, the color group with proportion of i and the color group without proportion of i, are color data of the n colors of the source color space. In step 211, the ratios of the m values of the color data set Z1 (108) to the m values of the color data set Z2 (210) are calculated component-wise. These ratios $V^i$ are applied component-wise to the current output in step 212 as the estimated effect of color i, and color i is added to the current color group (213). This is repeated if necessary until the color group is complete and thus the result of transformation 205 is available.

Figure 3:
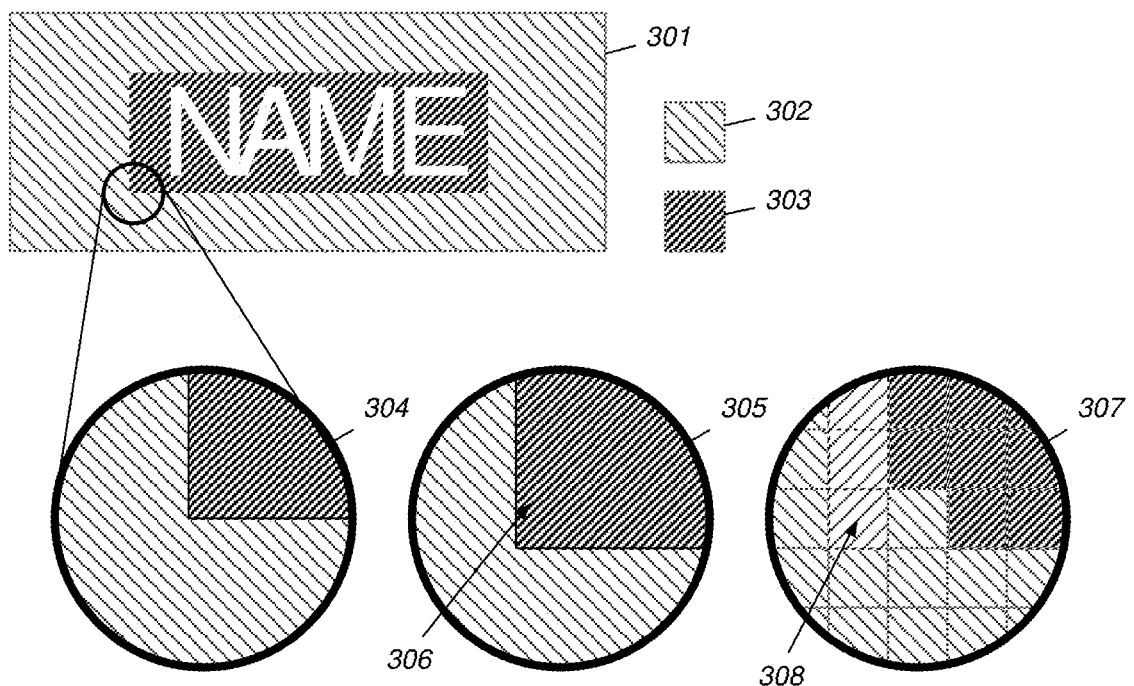

FIG. 3 illustrates the known occurrence of more than 4-color overprints, although the individual objects do not use more than 4 colors, in addition to the description on page 7. Shown is a stylized packaging design 201 with an image area 202 built up in 4 colors in CMYK and a logo area 203 with a spot color. The enlarged view 204 of the design shows that the contours of the CMYK image and spot color rectangle do not overlap, only abut. So there are no 5-color areas in the design. Only the so-called trapping 205 in print production, which is used as described to avoid register-related flashes, enlarges one of the contours and thus creates overprinting areas 206 of the spot color with CMYK, where 5 colors now appear simultaneously. Independently of this, halftoning with antialiasing 207 can also mix halftone dots from portions of the areas belonging to them, so that further 5-color pixels 208 with CMYK and spot color portions are created.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Method for computer-aided execution of transformations of color data from a source color space to a target color space using a transformation rule TRV, wherein
   the source color space comprises n colors, which are present in combinations of color components $q(1)$ to $q(n)$ in each point to be represented,
   the target color space comprises m values that can be combined to form combinations of components $z(1)$ to $z(m)$,
   combinations of them components of the target color space are assigned to at least some combinations of the n colors of the source color space via the transformation rule TRV,
   characterized by the following steps:
   a) for a combination KB of the n colors of the source color space with color components $q^{KB}(1)$ to $q^{KB}(n)$ for which no combination of the m components $z^{KB}(1)$ to $z^{KB}(m)$ of the target color space is assigned via the TRV, select a color i of the combination KB which has a color component $FA = q^{KB}(i) > 0$ and for which the following conditions apply:
   i) the remaining combination of color components $q^{KB}$ (j not equal to i) without the component of color i is assigned a combination of the target color space with components $z(1)^i, z(2)^i, \ldots, z(m)^i$, and
   ii) two further, with one exception mutually identical combinations of color components $q(1)$ to $q(n)$ exist, to each of which a combination of components $z(1)$ to $z(m)$ is assigned and wherein the two combinations of color components $q(1)^1$ to $q(n)^1$ and $q(1)^2$ to $q(n)^2$ differ only in that the color component $q(i)$ of color i in the one $q(i)^1 = FA > 0$ and in the other $q(i)^2 = 0$, so that
   1) The combination $q(1)^1$ to $q(n)^1$ with color component $q(i)^1 = FA$ is assigned a corresponding combination of the components $z(1)^1, z(2)^1, \ldots, z(m)^1$ of the m values of the target color space, which forms the color data set Z1, and
   2) the combination $q(1)^2$ to $q(n)^2$ with color component $q(i)^2 = 0$ is assigned a corresponding combination of the components $z(1)^2, z(2)^2, \ldots, z(m)^2$ of the m values of the target color space, which forms the color data set Z2,
   iii) Calculating the ratios $V(1)^i, V(2)^i, \ldots, V(m)^i$ of each component $z(1)^1, z(2)^1, \ldots, z(m)^1$ of the m values of the color data set Z1 to the respective component $z(1)^2, z(2)^2, \ldots, z(m)^2$ of the m values of the color data set Z2, which form a set of factors $V(1)^i = z(1)^1/z(1)^2$, $V(2)^i = z(2)/z(2)^{12}, \ldots, V(m)^i = z(m)/z(m)^{12}$,
   b) Applying the factors $V(1)^i, V(2)^i, \ldots, V(m)^i$ for transformations of combinations KB of colors of the source color space with n colors, which contain the color component FA of color i, but for which the color component $q(i) = 0$ is set for the transformation, into the target color space with m components by multiplying the $z(1)^i, z(2)^i, \ldots, z(m)^i$ of the target color space resulting from the transformation by the respective factors $V(1), V(2), \ldots, V(m)$, $z(m)^i$ of the target color space are multiplied by the respective factors $V(1)^i, V(2)^i, \ldots, V(m)^i$.

2. The method according to claim 1, characterized in that the method is applied to partial combinations of k<n colors for a given combination of then colors with combinations of color proportions $q(1)$ to $q(n)$.

3. The method according to claim 2, characterized in that the method is applied to successive partial combinations with k<n colors up to k=n, the resulting factors being applied multiplicatively.

4. Method according to claim 1, characterized in that the size of the color portion of a color is taken into account for achieving a higher accuracy by preferentially selecting from the possible colors i the one with smaller color portion.

5. Method according to claim 1, characterized in that for several different possible colors i1, i2, ... the results of the different estimates $z(1)^{i1}, \ldots, z(m)^{i1}$ as well as $z(1)^{i2}, \ldots, z(m)^{i2}$ etc. are averaged in a weighted manner, the weight of each estimate being selected to be greater the smaller the respective color proportion $q(i1), q(i2), \ldots$ of the color.

6. Method according to claim 1, characterized in that the components $z(1)$ to $z(m)$ of the target color space are device-dependent values.

7. Method according to claim 1, characterized in that the components $z(1)$ to $z(m)$ of the target color space are device-independent values.

8. Method according to claim 1, characterized in that the transformation rule TRV is in the form of transformation tables.

9. Method according to claim 1, characterized in that the method is carried out on a computer unit by means of control software, the computer unit comprising an input unit for providing the digital color data of the source color space of the project and an output unit for outputting the transformed values of the target color space as well as a memory on which transformation tables are stored, values for the target color space being generated for the color data of the source color space of the project by means of the control software using the transformation tables and applying the method according to claims 1 to 8 and being provided in a data set.

* * * * *